United States Patent [19]

Long et al.

[11] 4,110,792

[45] Aug. 29, 1978

[54] MOBILE INFORMATION DISPLAY SYSTEM

[76] Inventors: Douglas A. Long, 94 Sturgis Ridge Rd., Wilton, Conn. 06897; Frederick A. Burke, 40 Riverside Ave., Riverside, Conn. 06878

[21] Appl. No.: 789,833

[22] Filed: Apr. 22, 1977

[51] Int. Cl.[2] ........................ H04N 3/12; G08B 23/00

[52] U.S. Cl. ................................ 358/240; 340/324 M; 340/334

[58] Field of Search ................... 358/240; 340/324 M, 340/343, 166 EL, 334; 40/129 R, 129 C, 125 N, 125 H; 315/169 TY

[56] References Cited

U.S. PATENT DOCUMENTS

| | | | |
|---|---|---|---|
| 3,273,140 | 9/1966 | Foster et al. | 340/334 |
| 4,009,335 | 2/1977 | Payne et al. | 358/240 |

*Primary Examiner*—Robert L. Griffin
*Assistant Examiner*—Aristotelis M. Psitos
*Attorney, Agent, or Firm*—Michael Ebert

[57] ABSTRACT

A mobile information display system which may be transported to the site of a sports or entertainment event and then erected to provide a large screen display of video images produced by a live T-V camera so that even those members of the audience who are unable to obtain a full view of the activity may see the field action as well as instant replays. The system includes a lamp matrix display screen board, each lamp of which is individually controlled by a computer to pesent black-and-white video images derived from the live camera or other source. The matrix board is divided into a central panel and a pair of side wings hinged to the central panel and foldable thereover to form a compact stack which is carried horizontally on the bed of a trailer hauled by a tractor. The stack lies over a turntable provided with a hydraulically-operated lifting beam assembly mechanically linked to the rear of the center panel, whereby when the trailer is at the site, the lifting beam assembly is then operated to raise the board stack to a vertical viewing position, the side wings being swung out to complete the display screen. The turntable is then operated to cause the erect screen to assume the desired orientation with respect to the viewing audience.

10 Claims, 4 Drawing Figures

14B
14C
14A
23
19
18
16
A1
A2
12
17
17_3
21
22
24
26
15
13
11

MOBILE INFORMATION DISPLAY SYSTEM

BACKGROUND OF INVENTION

This invention relates generally to an information display system capable of presenting video pictures and other forms of information on a display screen constituted by a lamp matrix board, and more particularly to a mobile system of this type in which the matrix board is composed of foldable sections which may be erected at any desired site.

Many modern sport stadiums and entertainment arenas are designed to accommodate enormous audiences, ranging from 20,000 to as high as 70,000 spectators and more. Because the game or show being observed by the large audience is centered in a playing field or performing stage surrounded by stands or other seating arrangements, the typical spectator has only a general view of the performance and is quite distant from the scene of the activity.

In some sports and entertainment facilities, there are now installed large display screens at elevated positions where they may be conveniently viewed by the audience. These screens serve not only to present standard sports scoreboard data, but also instant replays as well as slow motion and close-ups. Thus the audience, which has a direct but distant view of the activity, and to that extent a sense of involvement and participation in the game or entertainment, is at the same time able to pick up significant details which are normally not perceptible. Screen sizes for this purpose may be as great as 30 by 40 feet.

The nature of the information display system depends on the prevailing lighting conditions. In an indoor arena in which the field or stage is illuminated by artificial light that is concentrated on the area of activity, use is generally made of a large-scale projection television system having a picture capability fully compatible with standard broadcast and closed-circuit video signals. This T-V projection screen is usually installed above the performing area at a position where the ambient light level is low and therefore does not wash out the screen presentation.

But a projection television information display system is unsuitable under daylight or outdoor lighting conditions where the ambient light level is high. To meet the requirements for an outdoor display screen viewable by a large audience, lamp display matrices have been developed formed by a large array of standard incandescent lamps that are selectively operated by a computer to create alpha-numeric information or to produce black and white video images whose picture elements are defined by the array of bulbs.

One commercially-available lamp matrix screen information display system is that manufactured and sold under the trademark "Telescreen" by Conrac Corporation. The Conrac screen makes use of a solid matrix of lamps, each of which is individually controlled by a computer for presenting video images derived from tape, film or live camera. Similar systems are supplied by Stewart Warner. This type of screen, in which the incandescent bulbs each produce a whitish light of a controllable intensity, will reproduce the gray shade scale of black-and-white broadcast television. In a sports stadium, a Conrac Telescreen permits the viewer to see close-ups of field actions, instant replays, slow motion, still and animated pictures, and it can also present to the spectators at the stadium an event taking place in a remote location.

Thus with a Telescreen, every spectator in the stadium, regardless of his line-of-sight or distance from the scene of activity, can now watch the field actions and replay with advantages comparable to those of intimate home TV viewing coupled with the satisfaction of being present at and seeing the actual event.

The use of a lamp matrix display screen system has heretofore been strictly limited to established sports and entertainment facilities designed for huge audiences, for these facilities can usually afford a permanent installation of this type. But many important professional and collegiate events take place in the open field with no fixed spectator seating facilities or in arenas of modest size for which the cost of a permanent installation is virtually out of the question.

Thus in a golf classic, the only way a spectator who comes to the golf course to see players engaging in competition can see the event is by accompanying the players from hole to hole. Where the crowd of spectators is large, this creates a problem; for only a few are then in a position to clearly see the action. On those occasions where the game is televised and the players are viewed by live video cameras, then the T-V viewers have a far better picture of the game than those spectators who are present at the playing site. But only a few golf competitions are televised, and the typical spectator at such an event does not have the benefit of a lamp matrix display screen system.

Similarly, there are many other sports events where the spectator's view of the action depends on where he sits—if the event lends itself to seating—or on how fast he can walk or how quickly he can strain his neck to catch the action. Thus many soccer, tennis, racing and other competitive events of great public interest are seen by spectators who, for lack of a screen display system, obtain only a partial and often unsatisfactory view of the action.

SUMMARY OF INVENTION

In view of the foregoing, it is the main object of this invention to provide a mobile information display system which is transportable to the site of a sports, entertainment or any other event, such as a political rally to afford a large screen display of video images derived from a live camera so that the audience is presented with an enlarged view of the activity.

More particularly, it is an object of this invention to provide a system of the above-type making use of a lamp matrix display screen board, the board being sectioned into a central panel and a pair of side wings hinged to the panel and foldable thereover to form a compact stack which may be transported to the site and then erected to assume a position viewable by the spectators at the event.

Also an object of this invention is to provide a mobile system in which the foldable lamp matrix display screen board, the control computer therefor and all other components of the system are transported on a trailer which is hauled to the site by a tractor, the screen being erected over the bed of the trailer whose position is stabilized by outriggers.

Yet another object of this invention is to provide a mobile information display system which, in addition to video images and other picture or alpha-numeric data, is capable of presenting advertising matter.

Briefly stated, these objects are attained in a mobile system including a lamp matrix display screen board, each lamp of which is individually-controlled by a computer to present black-and-white images derived from a live camera focused on the field activity or any other source of video signals, such as a video tape.

The matrix board is sectioned into a central panel and a pair of side wings hinged to the panel and foldable thereover to form a compact stack of superposed sections. The stack is carried on the bed of a trailer hauled by a tractor, the stack being supported over a turntable provided with a hydraulically-operated lifting beam assembly mechanically linked to the rear of the panel.

When the trailer is at the site, the lifting beam assembly is operated to raise the board stack to a vertical viewing position, the side wings then being swung out to complete the display screen. The turntable, which is rotatable throughout a 360° scale, is then operated to cause the erect screen to assume the desired orientation with respect to the viewing audience. To stabilize the structure, the trailer is provided with retractable outriggers which are extended at the site.

The system is not limited to trailer transportation; for, in practice, use may be made of a standard container of the type presently used in container ships. A container of this type is transportable by a truck, and a turntable and lifting assembly may be installed on the bottom well thereof, the top wall being formed by a retractable hatch to permit the erection of the screen above the container. All necessary equipment, including a power generator, may be installed in the container, and when the container is not in use, it may be stored in a warehouse or other storage facility.

OUTLINE OF DRAWINGS

For a better understanding of the invention as well as other objects and further features thereof, reference is made to the following detailed description to be read in conjunction with the accompanying drawings, wherein.

FIG; 3 is a plan view of the system; and

Figure 4:
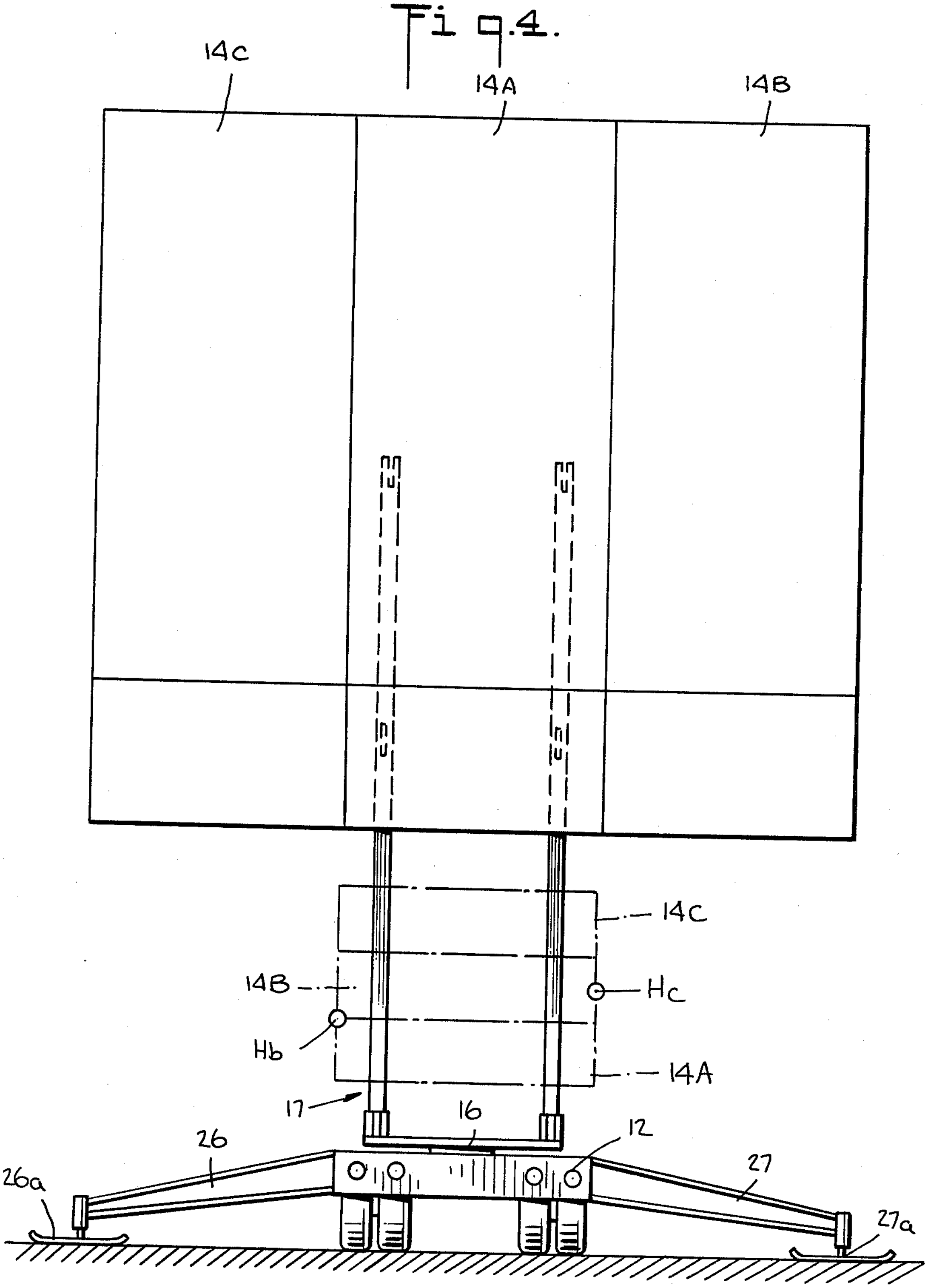

FIG. 4 is a front elevation of the system.

DESCRIPTION OF INVENTION

Figure 1:
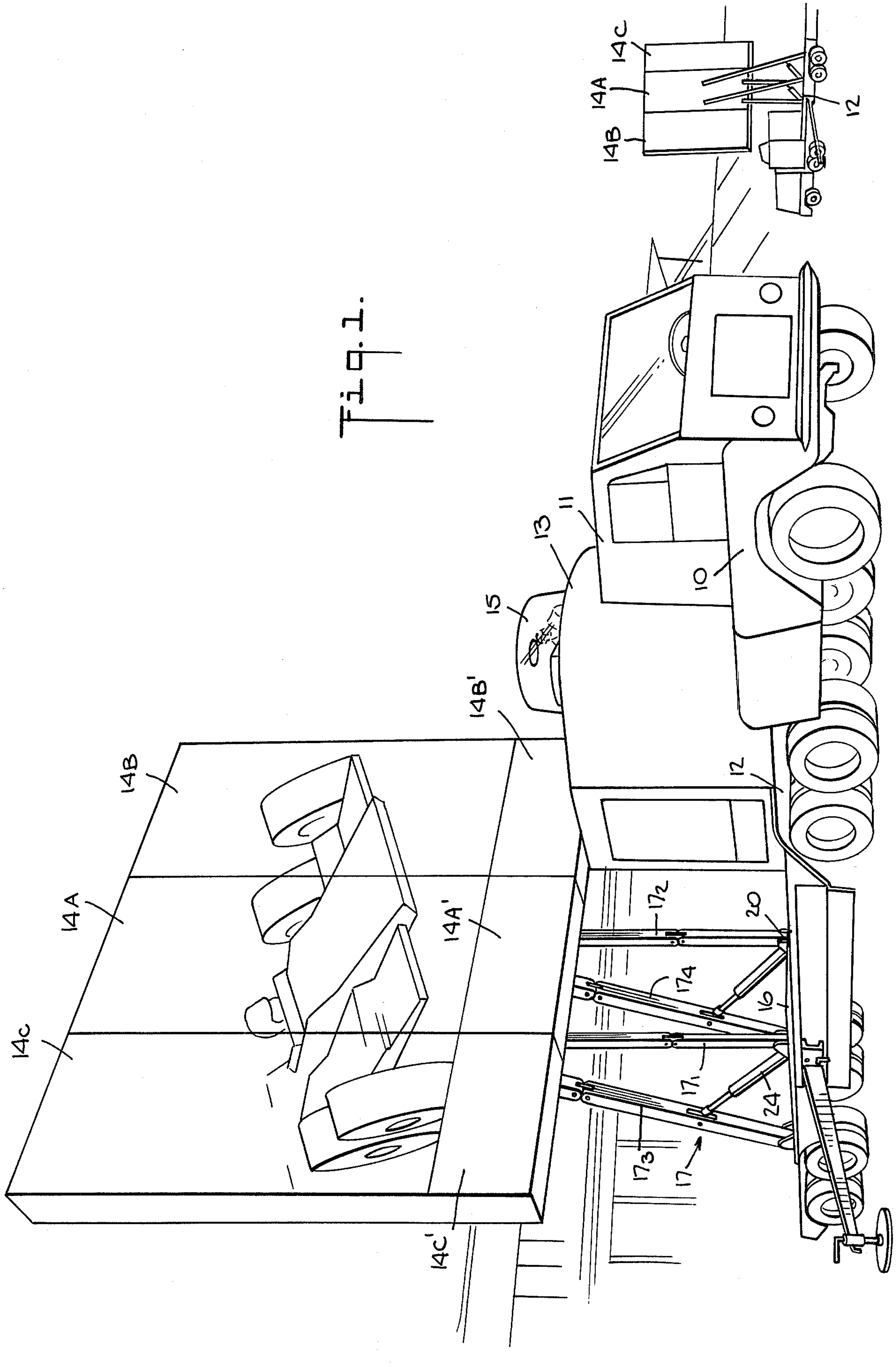
FIG. 1 is a perspective view showing two mobile trailer-tractor information display systems in accordance with the invention, with the erected screens of the two systems facing in different directions.

Referring now to FIG. 1, there are shown two identical mobile information display systems in accordance with the invention, the systems being set up in an arena or stadium. Each system includes a tractor 10 having a driver's cab 11, for hauling a flat bed trailer 12. Mounted on the trailer at the forward end thereof behind cab 11 is a control booth 13.

The system further includes a lamp matrix display screen board 14 sectioned into a central panel 14A and a pair of flanking wings 14B and 14C hinged to the central panel, the wings in FIG. 1 being outstretched to define an operative screen which may be viewed by that portion of the audience which faces the screen. It will be seen that the two systems have their screens facing in opposite directions, and assuming spectator stands on either side of the playing field, the audience in one stand is able to view the display on one screen and that in the other stand, the other screen display.

Where in an auto racing event the audience is dispersed at various areas along the track, at least two systems may be necessary to provide adequate display coverage, whereas in other events, a single system may be sufficient. The screen board itself is a conventional lamp matrix of the type commercially available which makes use of modules, each formed by a square array of standard incandescent lamps. A full matrix of lamps is made up of a large group of such modules with no vertical or horizontal spacing therebetween. In a screen board in accordance with the invention, the sectioning of the lamp matrix board is such as to divide the board into three sections of substantially identical size.

The lamps on the board are individually controlled by a computer installed in control booth 13 to present black-and-white video images derived from one or more live cameras viewing the action on the field or from other data signal sources; for the display board is also usable as a scoreboard and to present announcements in alpha-numeric form. The lowermost section 14A′ of the central panel and the lowermost sections 14B′ and 14C′ of the side wings do not contain lamps but are reserved for replaceable advertising displays. An upper zone of the screen may be reserved for the same purpose. Booth 12 is provided at its roof with a transparent observation dome 15, so that the operator can check the screen and also observe the location of the various live cameras. In this way, the master operator in the booth may, by a transmission link, direct the camera operators.

In practice, electrical power for operating the system may be derived from a diesel-powered generator in a satellite truck or from power lines in a stadium, depending, of course, on the availability of suitable power sources.

As best seen in FIG. 4, in the "transport mode" when the system is being hauled to the site or is in storage, the stack of superposed screen sections formed by center panel 14A and side wings 14B and 14C lies horizontally along the bed of trailer 12 above a turntable 16. The stack is supported by a hydraulic lifting beam assembly mounted on the turntable, generally designated by numeral 17. This assembly is collapsed in the transport mode in the manner to be later explained, and is expanded in the "exhibition mode" to raise the screen to a vertical viewing position.

As shown in FIG. 4, wing 14B is joined by a hinge $H_b$ to one side of center panel 14A at the junction of these screen sections, so that when wing 14B is folded over center panel 14A, it then lies directly thereover. Wing 14C is hinged to the opposite side of center panel 14A by a hinge $H_c$ whose position is at the midpoint of wing 14B in the depth dimension thereof, so that when wing 14C is folded in, it lies directly over wing 14B to complete the stack of superposed sections.

Alternatively, the screen board may be sectioned to provide a center panel whose width is equal to twice the width of each wing, so that the wings flanking the panel and hinged thereto at the junctions, may both be folded over the center panel to create a triptych. The resultant structure in the transport mode is, of course, broader than the stack of identical sections illustrated herein and therefore requires a broader trailer bed.

Figure 2:
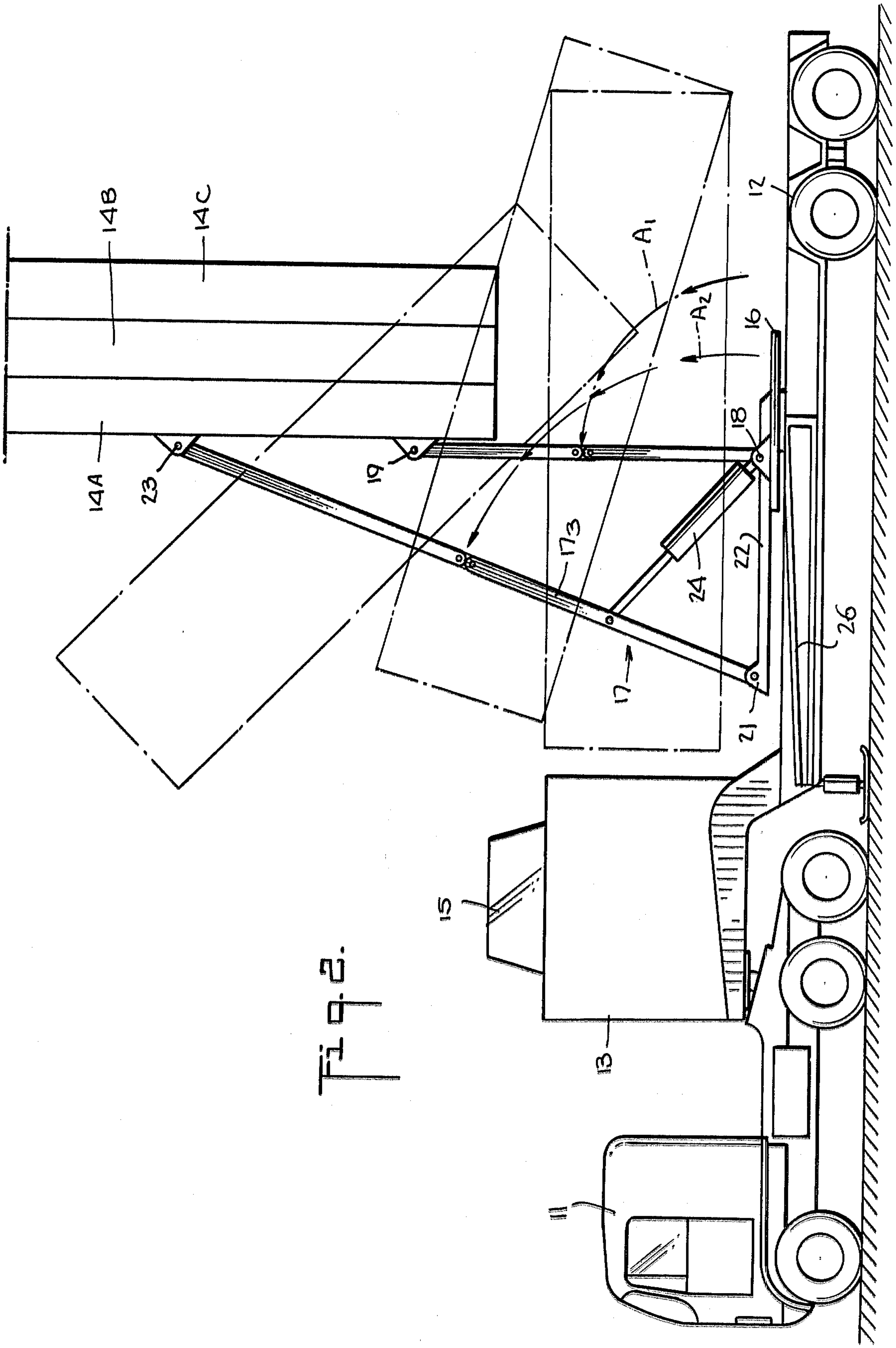
FIG. 2 is a side elevation of one of the display systems.
Figure 3:
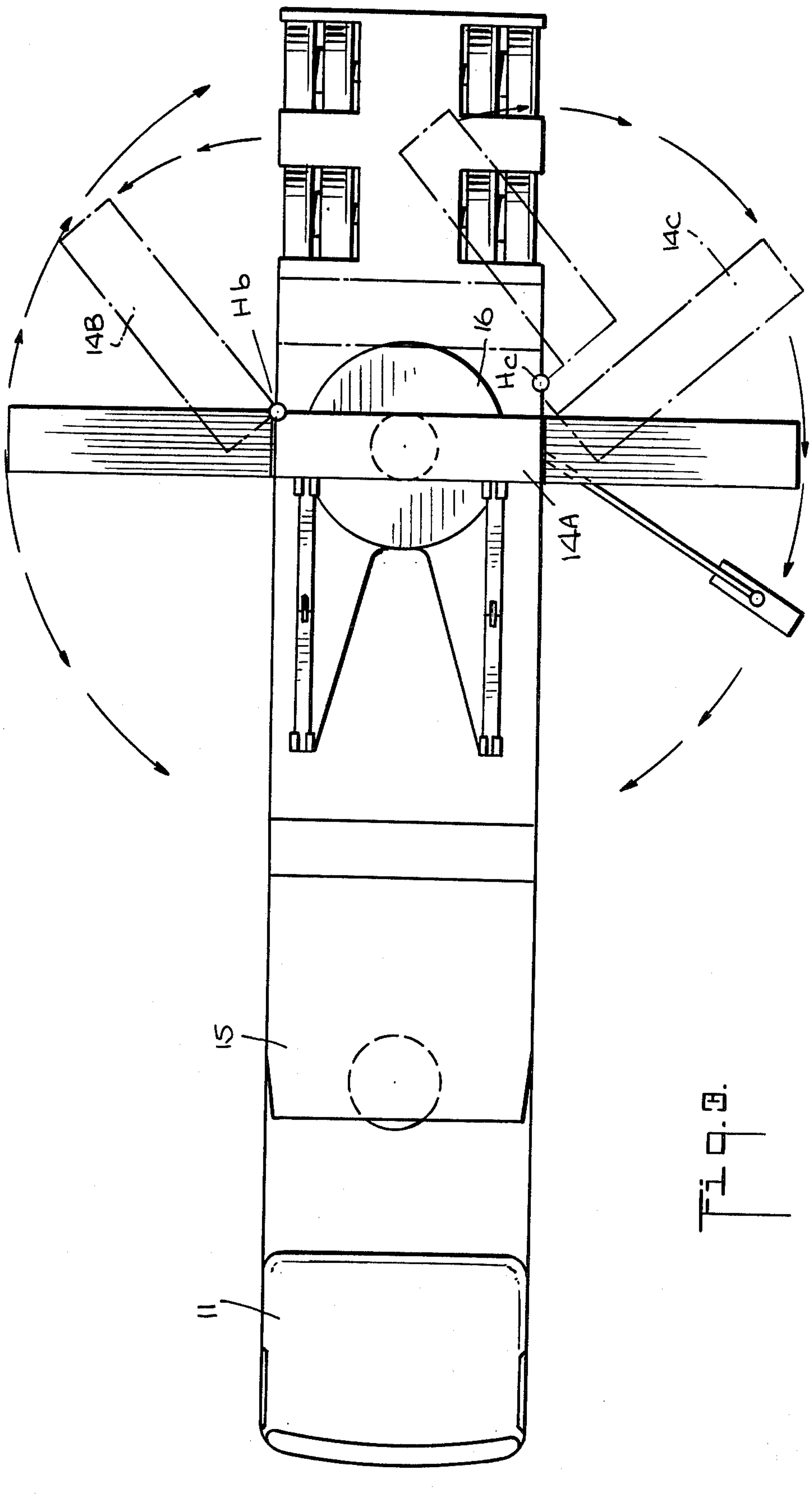

Lifting beam assembly 17, as best seen in FIGS. 1 and 2, is constituted by a pair of short foldable beams $17_1$ and $17_2$, and a pair of longer foldable beams $17_3$ and $17_4$. All of these beams are formed by upper and lower limbs which are hinged together to define knees. Short beam $17_1$ is pivoted at its lower end on a gudgeon 18 attached to turntable 16 and at its upper end to a gudgeon 19 attached to the rear of center panel 14A adjacent its lower end. Short beam $17_2$ is extended in a like manner between a gudgeon 20 attached to turntable 16 and a gudgeon (not shown) attached to the rear of center panel 14A. The direction in which the short beams are folded is indicated by arc $A_1$ in FIG. 2, the short beams being jack-knifed at their knees in the transport mode so that the stack may lie thereover. The short beams are fully extended in the exhibition mode to erect the screen.

Long beam $17_3$ is pivoted at its lower end on a gudgeon 21 attached to the free end of a horizontal plate 22 projecting from turntable 16 and at its upper end to a gudgeon 23 at about the midpoint on the rear of center panel 14A. Long beam $17_4$ is similarly connected between a gudgeon on a turntable extension plate and a gudgeon on the rear of the center panel.

A hydraulic cylinder 24 is extended between the turntable at a point adjacent gudgeon 16 and the lower limb of the foldable long beam $17_3$ and a hydraulic cylinder 25 is similarly arranged with respect to the lower section of long beam $17_4$ and the turntable.

In the transport mode, the long beams are folded, as indicated by arc $A_2$ in FIG. 2, to assume jack-knife positions below the screen stack. When the hydraulic cylinders are actuated in the exhibition mode, they serve to unfold the long beams, and this also effects unfolding of the short beams, thereby causing the stack to rise until it assumes the vertical position shown in FIG. 2, at which point the wings may be unfolded manually or by suitable motors and then locked in place.

The turntable, which is preferably operated through a suitable reduction gear by an electrical motor whose power is derived from the same source which supplies the information display system, is rotatable within a 360° scale, thereby making it possible to orient the screen to face the audience, wherever the audience is located.

Because the erect screen with its wings outstretched has a width greater than the width of the trailer bed, it is desirable to stabilize the bed. For this purpose, the bed is provided along either side with retractable outriggers 26 and 27, each terminating in anchors 26*a* and 27*a* that are adapted to engage the ground, the anchors being supported by threaded axles which turn in sleeves so that the anchors, regardless of the ground slope, may be set in place. The outriggers are retracted in channels along the sides of the trailer bed.

While there has been shown and described a preferred embodiment of a mobile information display system in accordance with the invention, it will be appreciated that many changes and modifications may be made therein without, however, departing from the essential spirit thereof.

We claim:

1. A mobile information display system transportable to the site of an event to afford a large screen display of video images derived from a live camera so that the audience may be presented with an enlarged view of the activity, said system comprising:
   (A) a lamp matrix screen board having an array of individually-controllable lamps, said board being sectioned into a central panel and a pair of side wings hinged thereto which are foldable thereover to form a compact stack;
   (B) a computer responsive to signals derived from said live camera and coupled to said lamps to cause said matrix to produce black-and-white images of said activity; and
   (C) transport means for carrying said stack and said computer to said site, said transport means including a turntable and a lifting assembly thereon coupled to the rear of said center panel and adapted to raise said stack from a horizontal position to vertical viewing position at which said wings may be unfolded to render said screen effective, said turntable functioning to orient said screen in the direction of the audience.

2. A system as set forth in claim 1, wherein said transport means is constituted by a trailer hauled by a tractor, said turntable being mounted on the bed of said trailer.

3. A system as set forth in claim 2, wherein said trailer is provided with a control booth for housing said computer.

4. A system as set forth in claim 2, wherein said booth includes an observation dome to permit an operator to check the screen.

5. A system as set forth in claim 2, wherein said trailer is provided with retractable outriggers to stabilize the bed.

6. A system as set forth in claim 1, wherein said panel and said wings are all of the same size, one of said wings being hinged to said panel to fold directly thereover, the other wing being hinged to said panel to fold over the one wing to provide a stack of superposed screen sections.

7. A system as set forth in claim 6, wherein said lifting assembly is formed by a pair of foldable short beams whose respective ends are pivotally attached to the turntable and to the lower end at the rear of the center panel, and a pair of foldable long beams whose respective ends are pivotally attached to the turntable and at a more elevated position at the rear of the center panel.

8. A system as set forth in claim 7, further including hydraulic means to unfold the long beams and thereby erect the stack.

9. A system as set forth in claim 1, wherein said screen board includes a lower section free of lamps to support replaceable advertisements.

10. A system as set forth in claim 1, further including motor means to rotate said turntable within a 360° scale.

* * * * *